United States Patent [19]

Celada et al.

[11] 3,904,397

[45] Sept. 9, 1975

[54] METHOD FOR REDUCING METAL ORES

[75] Inventors: Juan Celada; Patrick W. MacKay; Enrique Ramon Martinez; Antonio Villasenor; Ricardo Viramontes, all of Monterrey, Mexico

[73] Assignee: Fierro Esponja, S.A., Monterrey, Mexico

[22] Filed: July 3, 1972

[21] Appl. No.: 268,820

[52] U.S. Cl. ............................... 75/35; 75/91
[51] Int. Cl. ............................... C21b 13/14
[58] Field of Search ............... 75/34, 35, 26, 91

[56] References Cited
UNITED STATES PATENTS

| | | | |
|---|---|---|---|
| 2,243,110 | 5/1941 | Madaras | 75/35 |
| 3,635,456 | 1/1972 | Anthes et al | 75/34 X |
| 3,684,486 | 8/1972 | Osman | 75/34 |

*Primary Examiner*—L. Dewayne Rutledge
*Assistant Examiner*—M. J. Andrews
*Attorney, Agent, or Firm*—Curtis, Morris & Safford

[57] ABSTRACT

An improvement in a method for the batchwise gaseous reduction of metal oxides, e.g., iron ore, to metals, e.g., sponge iron, in a multiple unit reactor system of the type in which separate bodies of metal-bearing material are simultaneously treated in one or more reduction reactors and cooling reactors. Reduction is effected with a gas composed largely of carbon monoxide and hydrogen generated by the catalytic conversion of methane and steam at an elevated temperature. Improved cooling is obtained by first feeding the freshly prepared gas to a reduction reactor rather than a cooling reactor, thereby minimizing formation of methane in the cooling reactor. In a modified embodiment, methane is fed to the cooling reactor and at least a portion of the effluent gas is recycled through the catalytic reformer.

16 Claims, 5 Drawing Figures

METHOD FOR REDUCING METAL ORES

This invention relates to the gaseous reduction of metal oxides to elemental metals at elevated temperatures below the melting point of the metals, and more particularly, to an improved method of operating a multi-unit reactor system for effecting such a reduction process. The invention is especially useful in connection with the direct gaseouos reduction of iron oxide ores in lump or pellet form to sponge iron and will be illustratively described in connection with this use, although as the description proceeds, it will become apparent that the invention can be equally well used in processes wherein metal oxides other than iron oxides are reduced to elemental metals.

In one of its aspects the present invention comprises an improvement in a known type of semi-continuous process for producing sponge iron wherein a multiple unit reactor system is used in which separate bodies of ferrous material are treated simultaneously. A process of this type is disclosed in Celada U.S. Pat. No. 2,900,247 and Mader et al. U.S. Pat. Nos. 3,136,623, 3,136,624 and 3,136,625. The principal operations carried out in a reactor system of this type are (1) reduction of the ore to sponge iron, (2) cooling of the reduced ore and (3) discharging of the sponge iron from a reactor and recharging it with fresh iron ore to be reduced. Reduction is effected by a reducing gas which is commonly a mixture largely composed of carbon monoxide and hydrogen. The gas is typically generated by the catalytic conversion of a mixture of steam and methane into carbon monoxide and hydrogen in a catalytic reformer of known type according to the equation

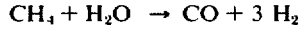

$$CH_4 + H_2O \rightarrow CO + 3 H_2$$

The effluent gas from the reformer is cooled and passed successively through a cooling reactor and one or more reduction reactors. During the cooling and reduction stages an additional reactor containing previously cooled reduced ore in the form of sponge iron is isolated from the system so that the sponge iron can be discharged from the reactor and the reactor charged with fresh ore. The reactor system is provided with suitable switching valves whereby at the end of each cycle the gas flow can be shifted to cause the cooling stage reactor to become the charging reactor, the last stage reduction reactor to become the cooling reactor and the charging reactor to become the first stage reduction reactor.

It has been found that in prior systems of this type wherein the cooled reducing gas is initially fed to the cooling reactor, there is a tendency, particularly during the later stages of the cooling operation, for the reforming reaction referred to above to go in the reverse direction, namely, for the carbon monoxide and hydrogen to combine to form methane and water vapor. Since this reverse reaction is exothermic, it tends to retard cooling of the sponge iron during the later portion of the cooling cycle.

Moreover, the reduced ore in the cooling reactor, while consisting largely of sponge iron, still contains a certain amount of unreduced oxide and hence a certain amount of reduction occurs during passage of cooling gas through the cooling reactor with the result that the gas flowing on to the reduction reactor has a somewhat lower reducing quality than the effluent gas from the reformer.

It is accordingly an object of the present invention to provide an improved method for the batchwise semi-continuous gaseous reduction of metal ores in a multiple reactor system. It is another object of the invention to overcome the disadvantages of prior reduction systems of this type as outlined above. It is a further object of the invention to provide a system for the gaseous reduction of iron ores to produce sponge iron of the general type described above which requires the use of only two reactors. Other objects of the invention will be in part obvious and in part pointed out hereafter.

The objects of the invention are achieved, in general, by generating a reducing gas largely composed of carbon monoxide and hydrogen as in prior processes, but feeding the reducing gas in the first instance to a reduction reactor rather than to a cooling reactor and using the effluent gases from the reduction reactor, after cooling, as a medium for cooling the reduced ore from a previous reduction cycle. The objects and advantages of the present invention may best be understood and appreciated by reference to the accompanying drawings which illustrate apparatus that can be used in carrying out the invention and wherein:

Figure 1:
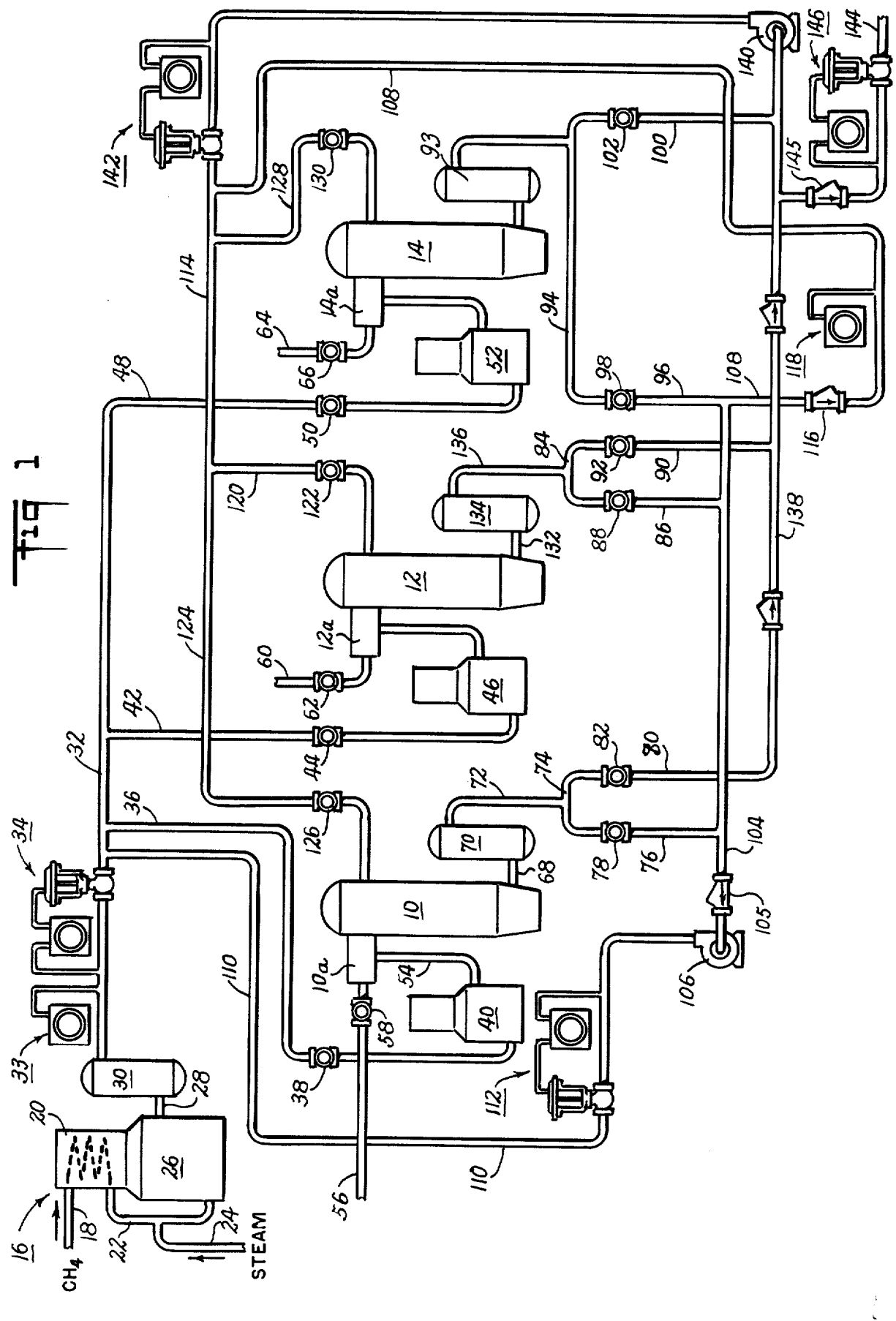
FIG. 1 illustrates a three-reactor system useful in carrying out an embodiment of the present invention.

Referring to the drawings and particularly to FIG. 1, the system there shown comprises reactors 10, 12 and 14 provided with the combustion chambers 10$a$, 12$a$ and 14$a$, respectively, that communicate with the upper portions of the reactors. The system will be initially described during that part of the cycle in which reactor 10 is the reduction reactor, reactor 12 is the cooling reactor and reactor 14 is the charging reactor.

Referring to the left-hand side of FIG. 1, a reducing gas composed largely of carbon monoxide and hydrogen is generated in a reformer 16 of known construction. Methane, natural gas or other hydrocarbon gas from a suitable source is supplied through pipe 18 and is preheated in the stack portion 20 of the reformer. It then flows through pipe 22 wherein it is mixed with steam supplied through pipe 24 and the methane-steam mixture enters the lower portion 26 of the reformer. In the lower section 26 of the reformer the methane-steam mixture is catalytically converted at an elevated temperature and in known manner into a reducing gas composed largely of carbon monoxide and hydrogen.

The resulting gas mixture flows through pipe 28 to a quench cooler 30 wherein it is cooled and dewatered and then to the reducing gas header 32 which contains a flow meter 33 and a back pressure controller 34. The header 32 is connected by a branch pipe 36 containing valve 38 with a tubular coil heater 40, by a branch pipe 42 containing valve 44 with a heater 46 and by branch pipe 48 containing a valve 50 with heater 52. During the portion of the cycle here being described valves 44 and 50 are closed and valve 38 is open.

Reducing gas flows through pipe 36 to heater 40 wherein it is heated to a temperature of the order of 700° to 850°C. Since the desired reducing gas temperature at the entrance to reduction reactor 10 is of the order of 900° to 1100°C., preferably about 1050°C., further heating of the gas leaving coil heater 40 is required, and this further heating is effected in combustion chamber 10a. More particularly, the effluent gas from heater 40 flows through a pipe 54 to combustion chamber 10a wherein it is mixed with an oxygen-containing gas supplied through pipe 56 containing valve 58. The oxygen-containing gas may be air or pure oxygen or mixtures thereof, but is preferably relatively pure oxygen to avoid introduction of nitrogen into the system. Within the combustion chamber a portion of the hot reducing gas is burned to provide a mixture having the desired relatively high temperature. The combustion chamber 10a may be of the type disclosed in Celada U.S. Pat. No. 2,900,247. It may be parenthetically noted that combustion chamber 12a can be supplied with oxygen-containing gas through a pipe 60 containing valve 62 and combustion chamber 14a can be supplied with oxygen-containing gas through a pipe 64 containing valve 66. However, during the portion of the cycle here being described valves 62 and 66 are closed.

It will be evident to those skilled in the art that the combustion chambers 10a, 12a and 14a may, if desired, be replaced by superheaters in order to heat the reducing gas from the outlet temperature of the coil heaters 40, 46 and 52 to the desired reducing temperature of 900° to 1100°C.

The volume of oxygen-containing gas used, as well as its temperature depends upon the oxygen content of the gas. Thus if air is used as the oxygen-containing gas, it is desirably preheated to a temperature of the order of 700°C. or higher, whereas if oxygen is used, it need not be preheated or may be preheated to a substantially lower temperature. Similarly, if air is used as the oxygen-containing gas, the volumetric ratio of air to reducing gas with which it is mixed may be as high as 0.4:1 and is typically in the range 0.15 to 0.3. If, on the other hand, oxygen is used as the oxygen-containing gas, a volumetric ratio within the range 0.05 to 0.15 will usually give acceptable results.

From combustion chamber 10a the hot reducing gas enters the top of reactor 10 and flows down through the ore bed therein to effect a reduction of the ore to sponge metal. As will now be described, a substantial proportion of this gas is recycled to produce a relatively high mass flow rate of the gas through the ore bed.

The effluent gas from reactor 10 leaves the reactor near the bottom thereof through a pipe 68 and passes through a quench cooler 70, wherein it is cooled and dewatered and then through a pipe 72 to a header 74. Connected to header 74 there is a branch pipe 76 containing a valve 78 and a branch pipe 80 containing a valve 82. In like manner, effluent gas from reactor 12 can flow to header 84 connected to a branch pipe 86 containing a valve 88 and a branch pipe 90 containing a valve 92. Also effluent gas from reactor 14 can flow through a cooler 93 to a header 94 connected to a branch pipe 96 containing a valve 98 and a branch pipe 100 containing a valve 102. During the portion of the cycle here being described valves 78 and 92 are open and valves 82, 88, 98 and 102 are closed.

A portion of the effluent gas from reduction reactor 10 is reheated and recycled to the reduction reactor and the remainder of the effluent gas is transferred to the cooling gas system in a manner described below. More particularly, the effluent gas from reducing reactor 10 flows through pipe 76 to the reducing gas recycle header 104 which contains a check valve 105 and is connected at one end to the suction side of the reducing gas recirculating pump 106 and at its other end to a gas transfer pipe 108. From the pump 106 reducing gas flows through pipe 110 containing flow controller 112 to the header 32 and thence through heater 40 and combustion chamber 10a to the reactor 10. The portion of the reducing gas withdrawn from the reducing gas circuit through pipe 108 flows to the cooling gas header 114. As shown in FIG. 1, the pipe 108 contains a check valve 116 and flow meter 118.

The volumetric ratio of gas recycled by pump 106 to make-up reducing gas from the reformer 26 may vary from say 0.5:1 to as high as 10:1, but is typically of the order of 2:1 to 3:1. Recycling of the reducing gas to the reactor 10 increases the mass flow rate through the ore bed, thereby maintaining the bed at a more nearly uniform and higher average temperature. Also such recycling permits a greater utilization of the reducing components of the gas.

As pointed out above, during the portion of the cycle now being described, reactor 12 operates as a cooling reactor and cooling gas is circulated therethrough in a manner now to be described. As pointed out above, a portion of the cooled reducing gas from the reducing gas circuit flows through pipe 108 to header 114. The header is connected to the top of reactor 12 by a branch pipe 120 containing open valve 122. It is also connected to the top of reactor 10 by a branch pipe 124 containing valve 126 and to the top of reactor 14 by a branch pipe 128 containing valve 130, but during the portion of the cycle here being described valves 126 and 130 are closed.

The cooling gas flows through pipe 120 to reactor 12 and downwardly through the bed of reduced ore therein to cool it. Effluent gas from reactor 12 flows through pipe 132 to a quench cooler 134, wherein it is cooled and dewatered, and thence through a pipe 136, header 84 and pipe 90 to the cooling gas recycle header 138. Recycling of the cooling gas is effected by connecting header 138 to the suction of cooling gas recycle pump 140, the discharge of which is connected to header 114. As shown in FIG. 1, header 114 contains a flow controller 142 located between the discharge of pump 140 and the point at which transfer pipe 108 is connected to the header.

Thus a cooling gas circuit is provided comprising reactor 12, pipe 132, cooler 134, pipe 136, header 84, pipe 90, header 138, pump 140, header 114 and pipe 120. Near the suction side of pump 140 gas is continuously withdrawn from this circuit through a fuel header 144 containing a check valve 145 and a back pressure regulator 146 to maintain the pressure in the cooling gas circuit substantially constant. The gas withdrawn through the fuel header 144 may be used as a fuel gas to heat the reformer 16 and/or the heaters 40, 46 and 52. It may, if desired, be supplemented and enriched by the addition of methane or natural gas thereto.

The volumetric ratio of gas circulating in the cooling gas circuit to gas entering the circuit through pipe 108 is desirably within the same range as that of the reducing gas circuit, i.e., 0.5 to 10 with the preferred ratio being of the order of 2:1 to 3:1.

During the portion of the cycle now being described the reactor 14 is effectively isolated from the rest of the system by the closed valves 50, 98, 102, 130 and 66. During this period the cooled sponge iron is discharged therefrom and the reactor is charged with fresh ore. At the end of a cycle the reactors are functionally interchanged, that is, the reactor 10 becomes the cooling reactor, the reactor 12 becomes the discharging and charging reactor and the reactor 14 becomes the reduction reactor. The manner in which the various valves described above can be opened or closed to effect this interchange will be apparent to those skilled in the art.

Figure 2:
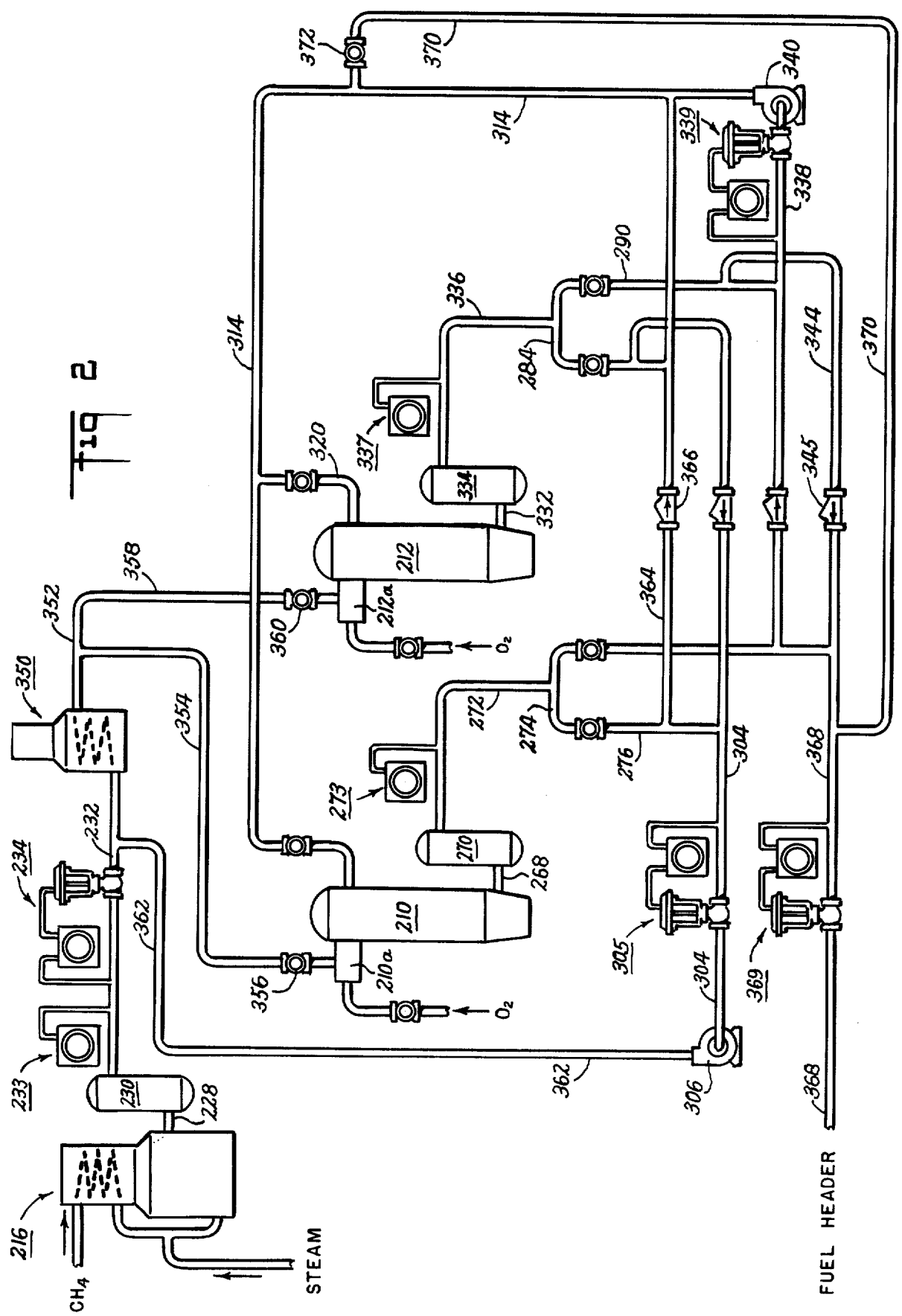
FIG. 2 illustrates a two-reactor system useful in carrying out an embodiment of the invention.

Turning now to FIG. 2 of the drawings, this Figure illustrates an embodiment of the invention wherein only two reactors and one coil heater are used. The system of FIG. 2 comprises the reactors 210 and 212, similar to the reactors 10 and 12 of FIG. 1, and having the associated combustion chambers 210a and 212a, respectively. The system will be initially described with reactor 210 operating as a reduction reactor and reactor 212 operating as a cooling reactor. As in the case of FIG. 1, a gas largely composed of carbon monoxide and hydrogen is generated in a reformer 216 and flows through pipe 228 to a quench cooler 230, wherein it is cooled and dewatered. From the cooler 230 the reducing gas flows through pipe 232 containing a flow meter 233 and a back pressure controller 234 to a single coil heater 350 which serves both reactors. Within the heater 350 the gas is heated to a temperature of 700° to 850°C. and then flows to a hot reducing gas header 352 connected by branch pipe 354 containing valve 356 to the combustion chamber 210a of reactor 210 and by a branch pipe 358 containing valve 360 to the combustion chamber 212a of reactor 212. During the portion of the cycle now being described valve 360 is closed and valve 356 is open.

As in the case of the system of FIG. 1, the system of FIG. 2 includes a reducing gas circuit for recycling the reducing gas leaving the reduction reactor, a cooling gas circuit for recycling cooling gas leaving the cooling reactor, a gas transfer pipe for transferring a portion of the reducing gas from the reducing gas circuit to the cooling gas circuit and a means for removing a predetermined amount of the cooling gas from the cooling gas circuit. More particularly, the hot gas entering reactor 210 from combustion chamber 210a flows downwardly through a bed of ore in the reactor to reduce it largely to sponge iron during the reduction cycle. Effluent gas from reactor 210 flows through pipe 268, cooler 270, pipe 272, which contains a flow meter 273, header 274, pipe 276, pipe 304 containing flow controller 305, pump 306 and a pipe 362 to pipe 232, thence again through heater 350 and pipes 352 and 354 to the combustion chamber 210a and reactor 210. From pipe 276 of the reducing gas circuit, gas is withdrawn through a pipe 364 containing a check valve 366 and flows to the cooling gas recycle header 314 of the cooling gas circuit. The cooling gas circuit includes cooling reactor 212 from which effluent gas flows through pipe 332, cooler 334, pipe 336, which contains flow meter 337, header 284, pipe 290, pipe 338, which contains flow controller, pump 340, pipe 314 and pipe 320 back to the top of reactor 212. The recycle ratios for the reducing gas and cooling gas circuits may be within the same range as mentioned in connection with FIG. 1. Gas is continuously withdrawn from the cooling gas circuit through pipe 344 containing check valve 345 and flows to a fuel header 368 containing a back pressure controller 369. The gas thus removed, supplemented with added methane or natural gas if necessary, can be used as a fuel gas to supply heat to the reformer 216 and/or heater 350.

The system of FIG. 2 differs from that of FIG. 1 in that the reactor 212 is used as both a cooling reactor and a discharging and charging reactor. The recycle ratio in the reduction and cooling circuits are so adjusted that the cooling cycle is completed in a shorter period of time than the reduction cycle. The time interval between completion of the cooling cycle and completion of the reduction cycle is such that reactor 212 can be discharged and charged with fresh ore by the time the reduction cycle is completed in reactor 210. Upon completion of the reduction cycle the reactors are functionally interchanged as described in connection with FIG. 1, that is to say, the reactor 210 becomes a cooling reactor and reactor 212 becomes a reduction reactor.

Figure 5:
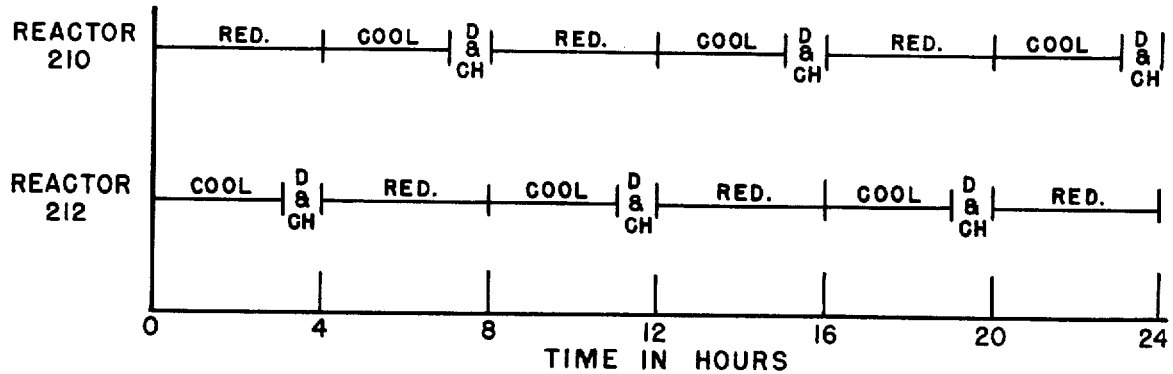
FIG. 5 illustrates a typical time schedule for operating a two-reactor system of the type shown in FIGS. 2 and 3.

A typical schedule for operation of the reactors over a 24-hour period is shown in FIG. 5 of the drawings. Referring to FIG. 5, this Figure shows that reactor 210 operates for a period of 4 hours as a reduction reactor and then 3 hours as a cooling reactor, after which it is discharged and recharged, and then the cyclic operation is repeated. In like manner, reactor 212 operates for 3 hours as a cooling reactor and then is discharged and charged with fresh ore in the ensuing hour, after which it operates as a reduction reactor for 4 hours. Thereafter the cyclic operation of reactor 212 is repeated.

Thus with the system of FIG. 2, the reduction, cooling and discharging operations are carried out in two reactors in such manner as to achieve exceptionally efficient utilization of the equipment. Since only two reactors are used, the capital equipment costs are reduced in comparison with systems using three or more reactors.

During the discharging and charging operation, the reactor is isolated from the system, and therefore it is necessary to make some provision for the portion of the reduction reactor effluent gas that is withdrawn from the reducing gas circuit. Reverting to FIG. 2, the cooling gas header 314 is connected by a pipe 370 containing a valve 372 to the fuel header 368. During the period that one or the other of the reactors is being discharged and charged, valve 372 is opened to permit the transfer gas to flow directly to the fuel header 368.

As pointed out above in connection with the discussion of the prior process disclosed in the Mader and Celada patents, when the reducing gas from the reformer is fed successively to a cooling reactor and a reduction reactor, there is a tendency, during the later stages of the cooling cycle for the hydrogen and carbon monoxide to produce methane and water vapor, and since this reaction is exothermic, it tends to retard the cooling of the sponge iron. This reaction can be inhibited to a significant extent by using the process illustrated in FIGS. 1 and 2 wherein the freshly formed gas from the reformer is fed first to the reduction reactor and then cooled and fed to the cooling reactor. This undesired reaction can be still further suppressed by using the modification of the present invention illustrated in FIG. 3 of the drawings.

Figure 3:
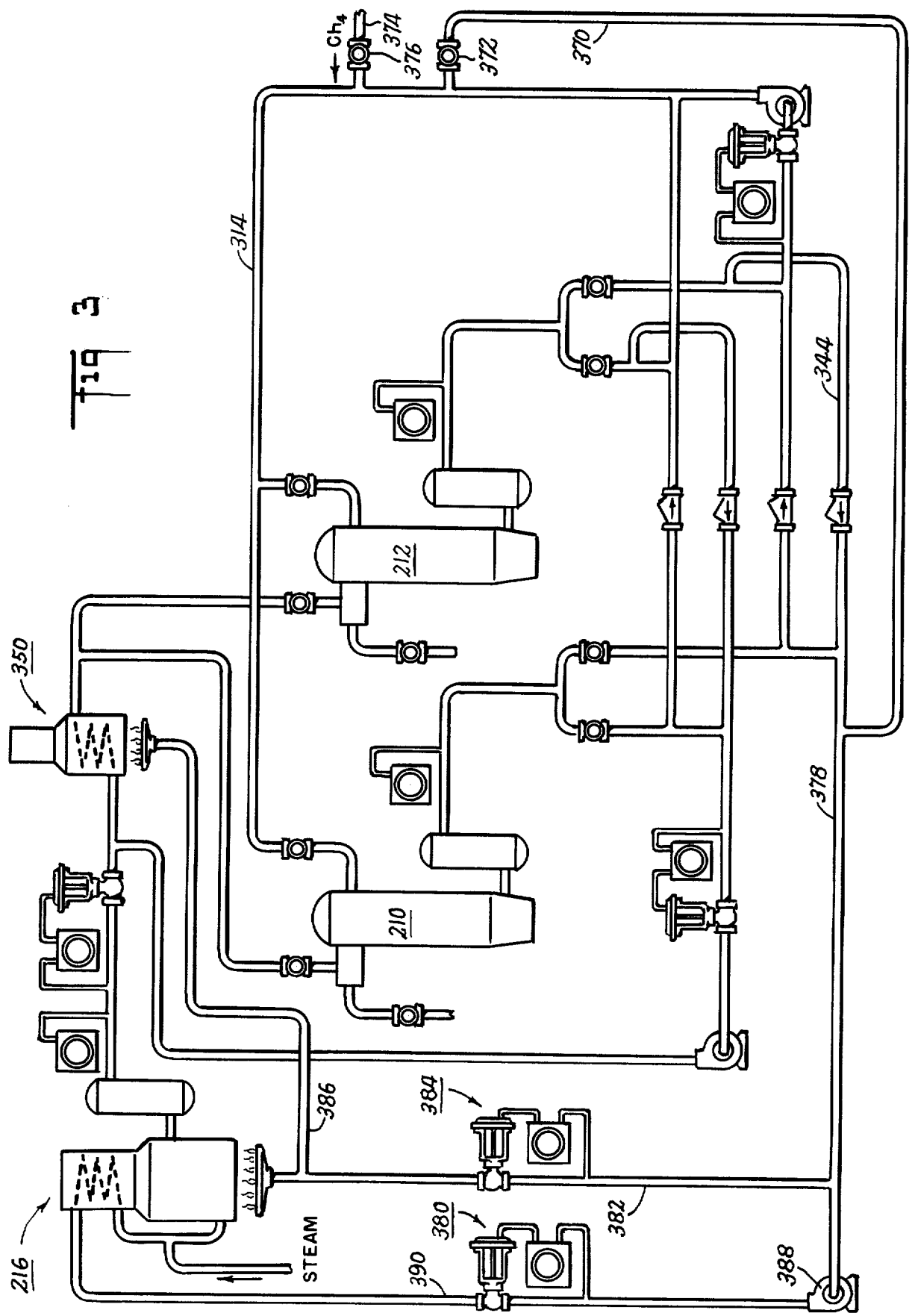
FIG. 3 illustrates a modification of the system of FIG. 2 wherein the methane supplied to the system is fed to the cooling gas recycle portion of the system and the effluent gas from the cooling gas recycle is used as the methane feed to the reformer.

Referring to FIG. 3, since this Figure is closely similar to FIG. 2, only the differences between the two Figures will be described and the same reference numerals will be used to designate corresponding parts in the two Figures. The principal differences in the system of FIG. 3 are that the methane fed to the system enters the system via the cooling gas circuit and the gas leaving the cooling gas circuit is recycled through the reformer.

Referring to FIG. 3, connected to cooling gas recycle header 314 there is a pipe 374 containing a valve 376 through which methane is fed to the cooling gas circuit. Addition of methane at this point produces a cooling gas relatively rich in methane which suppresses the reaction referred to above, namely,

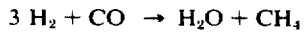

$$3 H_2 + CO \rightarrow H_2O + CH_4$$

The gas withdrawn from the cooling gas circuit through pipes 344 and 370 flows to a header 378. A portion of the gas flowing through header 378 is diverted through pipe 382 containing back pressure controller 384 to be used as a fuel gas for reformer 216 and through branch pipe 386 to be used as a fuel gas for heater 350. The remainder of the gas flowing through header 378 is pumped by pump 388 through pipe 390 containing flow controller 380 to reformer 216 as the feed gas to the reformer.

Figure 4:
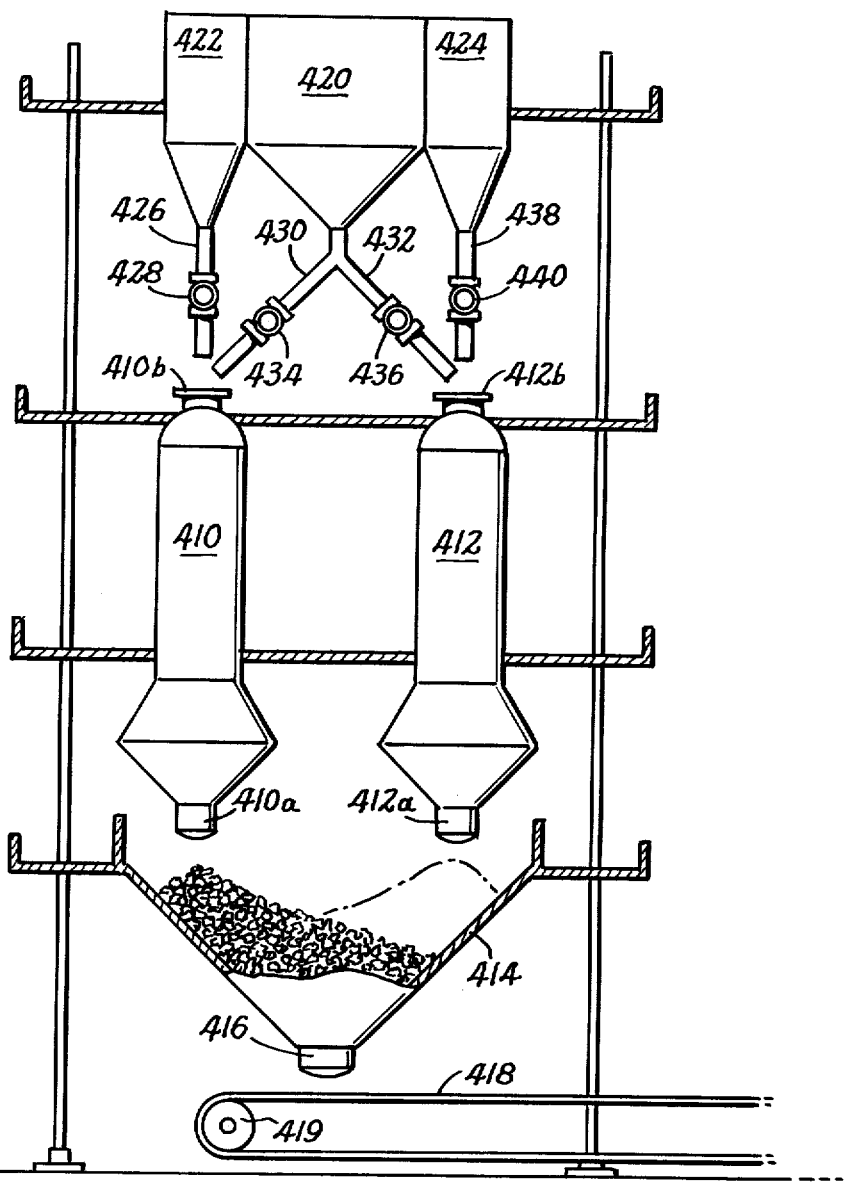
FIG. 4 illustrates a method of feeding ore to and removing sponge iron from a two-reactor system.

Turning now to FIG. 4 of the drawings, one of the advantages of a two-reactor system such as that shown in FIGS. 2 and 3 is that it permits the use of a compact and efficient solids feeding and discharge apparatus. The reactors 410 and 412 of FIG. 4, as well as those of FIGS. 1 to 3, may be constructed as disclosed in U.S. Pat. No. 3,467,368, wherein a bed of inert particulate refractory material, e.g., gangue, is first formed in the bottom of the reactor and supports a subsequently charged bed of iron ore to be reduced. The reactors are positioned above a single discharge hopper 414 having a regulatable closure 416 located above an endless conveyor belt 418. The belt 418 is driven by a roller 419 on which it is mounted. The roller 419 may be driven by any suitable means such as a motor (not shown). The reactors 410 and 412 have at the bottom thereof removable closures 410a and 412a, respectively. Thus when, for example, reactor 410 reaches the end of a cooling cycle, the closure 410a can be opened to discharge cooled sponge iron into hopper 414 and the closure 416 regulated to feed sponge iron to belt 418 for transmission to a steel-making furnace or point of storage.

Reactors 410 and 412 have removable covers 410b and 412b through which they may be charged. Mounted above the reactors there is a centrally located iron ore hopper 420 having the hoppers 422 and 424 on each side thereof, the latter hoppers being adapted to contain a particulate refractory material such as gangue. Hopper 422 has at the bottom thereof a discharge conduit 426 having a valve or gate 428 therein. The lower end of conduit 426 is movable into registry with the top of reactor 410 when cover 410b has been removed to permit the reactor to be charged with refractory material from hopper 422. Hopper 420 has a pair of conduits 430 and 432 at the bottom thereof having the valves or gates 434 and 436 therein, respectively. The lower ends of conduits 430 and 432 are movable into registry with the tops of reactors 410 and 412, respectively, to permit charging of the reactors with ore from hopper 420. Hopper 424 has a discharge conduit 438 containing a valve or gate 440 and movable into registry with the top of reactor 412 for charging reactor 412 with refractory material from hopper 424. When it is desired to charge, for example, reactor 410, the cover 410b is removed therefrom, valve 428 is opened for a period of time to permit a desired amount of refractory material to drop into the reactor to form a bed at the bottom thereof as disclosed in U.S. Pat. No. 3,467,368. Then ore valve 434 is opened to complete the charging of the reactor and cover 410b is replaced. Reactor 412 can be charged in a corresponding manner. The reactors, feed hoppers, discharge hopper and conveyor form a compact and efficient solids handling unit.

It is, of course, to be understood that the foregoing description is illustrative only and that numerous other ingredients, proportions and operating conditions can be used without departing from the scope of the invention as defined in the appended claims. For example, as pointed out at the beginning of the specification, the present method may be used in the reduction of ores other than iron ore, e.g., ores of metals such as nickel, copper, tin, titanium, barium and calcium. It is also apparent that the apparatus shown in FIG. 4 of the drawings can be adapted quite readily to a 3-reactor system. Other modifications within the scope of the invention will be apparent to those skilled in the art.

We claim:

1. In a method for the batchwise gaseous reduction of metal oxides to metals in a multiple unit reactor system of the type in which separate bodies of metal-bearing material are simultaneously treated in a plurality of reactors and a reducing gas is passed successively through reactors of said system, the improvement which comprises feeding a preformed hot reducing gas largely composed of carbon monoxide and hydrogen and at a temperature of 900° to 1100°C. through a body of metal oxide in a reduction reactor of said system to reduce said metal oxide at least partially to sponge metal, cooling the effluent gas from said reduction reactor, reheating a portion of said cooled effluent gas to a temperature of 900° to 1100°C. and recirculating it through said reduction reactor to form a reduction gas circuit, and passing the remainder of said cooled effluent gas through a body of largely reduced metal oxide in a cooling reactor of said system to cool the body of reduced metal oxide therein.

2. A method according to claim 1 wherein at least a portion of the effluent gas from said cooling reactor is cooled and recycled to said cooling reactor.

3. A method according to claim 1 wherein a portion of the effluent gas from said cooling reactor is cooled and recycled to said cooling reactor and the remainder of said cooled effluent gas is removed from said system for use as a fuel gas.

4. A method according to claim 1 wherein the volumetric ratio of gas recycled to said reduction reactor to the gas fed to said reduction gas circuit is from 1:1 to 10:1.

5. A method according to claim 2 wherein the volumetric ratio of gas recycled through said cooling reactor to effluent gas from said reduction reactor passing to said cooling reactor is from 1:1 to 10:1.

6. A method according to claim 1 in which said system comprises three reactors, the first of which is said reduction reactor, the second of which is said cooling reactor and the third of which is disconnected from said first and second reactors for discharge of reduced ore from said third reactor and recharging thereof with fresh ore.

7. A method according to claim 1 in which said system comprises two reactors, the first of which is said reduction reactor and the second of which is said cooling reactor, and the flow of gas through said cooling reactor is interrupted while continuing the flow of reducing gas through said reduction reactor for a predetermined time interval, said time interval being sufficient to permit discharge of reduced ore from said cooling reactor and recharging thereof with fresh ore.

8. In a method for the batchwise gaseous reduction of metal oxides to metals in a multiple unit reactor system of the type in which separate bodies of metal-bearing material are simultaneously treated in a plurality of reactors and a reducing gas is passed successively through reactors of said system, the improvement which comprises feeding a preformed hot reducing gas largely composed of carbon monoxide and hydrogen and at a temperature of 900° to 1100°C. through a body of metal oxide in a reduction reactor of said system to reduce said metal oxide at least partially to sponge metal, cooling the effluent gas from said reduction reactor, reheating a portion of said cooled effluent gas to a temperature of 900° to 1100°C. and recirculating it through said reduction reactor, passing the remainder of said cooled effluent gas through a body of largely reduced metal oxide in a cooling reactor of said system to cool the body of reduced metal oxide therein, and continuing the flow of cooled gas through said cooling reactor for a predetermined time interval, said time interval being sufficient to permit discharge of reduced ore from a third reactor of said system and recharging of said third reactor with fresh ore.

9. A method according to claim 8 wherein at least a portion of cooled effluent gas flowing from said reduction reactor through said cooling reactor is cooled and recirculated through said cooling reactor.

10. In a method for the batchwise gaseous reduction of metal oxides to metals in a multiple unit reactor system of the type in which separate bodies of metal-bearing material are simultaneously treated in a plurality of reactors, a reducing gas composed largely of carbon monoxide and hydrogen is generated by the catalytic conversion of a mixture of methane and steam in a reformer, and said reducing gas is passed successively through reactors of said system, the improvement which comprises heating said reducing gas to a temperature of 900° to 1100°C., passing the heated gas through a body of metal oxide in a reduction reactor of said system to reduce said metal oxide at least partially to sponge metal, cooling the effluent gas from said reduction reactor, reheating a portion of said cooled effluent gas to a temperature of 900° to 1100°C. and recirculating it through said reduction reactor, passing the remainder of said cooled effluent gas through a body of largely reduced metal oxide in a cooling reactor of said system to cool the body of reduced metal oxide therein, cooling a first portion of the effluent gas from said cooling reactor and recycling it to said cooling reactor, adding methane to the gas recycled to said cooling reactor, and using a second portion of the effluent gas from said cooling reactor as the methane fed to said reformer.

11. A method according to claim 10 wherein a third portion of the effluent gas from said cooling reactor is used as fuel gas to supply heat to said reformer.

12. A method according to claim 11 wherein a third portion of the effluent gas from said cooling reactor is used as fuel gas to heat the reducing gas supplied to said reduction reactor.

13. A method according to claim 10 wherein the effluent gas from said cooling reactor other than said recycled first portion is used (a) as the methane feed to said reformer, (b) as a fuel gas to supply heat to said reformer and (c) as a fuel gas to heat the reducing gas supplied to said reduction reactor.

14. A method according to claim 10 wherein the flow of cooling gas through said cooling reactor is interrupted while continuing the flow of reducing gas through said reduction reactor for a predetermined time interval, said time interval being sufficient to permit discharge of reduced ore from said cooling reactor and recharging thereof with fresh ore.

15. A method according to claim 14 wherein during said time interval said remainder of said cooled effluent gas from said reduction reactor is mixed with said added methane and at least a portion of the resulting mixture is used as the methane feed to said reformer.

16. A method according to claim 15 and wherein said resulting mixture is used (a) as the methane feed to said reformer, (b) as a fuel gas to supply heat to said reformer and (c) as a fuel gas to heat the reducing gas supplied to said reduction reactor.

* * * * *